United States Patent [19]

Augsburger et al.

[11] 4,227,545
[45] Oct. 14, 1980

[54] VALVE FOR CONTROLLING THE FLOW OF HOT FLUIDS

[75] Inventors: Rolf Augsburger; Horst Kuppka; Helmut Zilling, all of Nuremberg, Fed. Rep. of Germany

[73] Assignee: Klein, Schanzlin & Becker AG, Frankethal, Fed. Rep. of Germany

[21] Appl. No.: 819,296

[22] Filed: Jul. 27, 1977

[30] Foreign Application Priority Data

Jul. 28, 1976 [DE] Fed. Rep. of Germany ....... 2633808

[51] Int. Cl.² ..................... F16K 49/00; F16K 25/00
[52] U.S. Cl. .................................... 137/340; 251/172
[58] Field of Search ................ 137/340; 251/170, 172, 251/174

[56] References Cited

U.S. PATENT DOCUMENTS

| 2,520,288 | 8/1950 | Shand et al. | 251/174 |
| 2,705,016 | 3/1955 | Saar | 137/340 |
| 3,062,238 | 11/1962 | Boyd | 251/172 |
| 3,209,778 | 10/1965 | Flohr | 251/170 |
| 3,388,715 | 6/1968 | Ellis | 251/174 |
| 3,575,198 | 4/1971 | Ellis | 251/172 |
| 3,794,291 | 2/1974 | Suyama | 251/174 |
| 3,916,940 | 11/1975 | Allen | 137/340 |
| 4,020,864 | 5/1977 | Church | 251/174 |

Primary Examiner—Martin P. Schwadron
Assistant Examiner—A. Michael Chambers
Attorney, Agent, or Firm—Peter K. Kontler

[57] ABSTRACT

A valve for controlling the flow of hot fluids in nuclear reactor plants or similar institutions has a tubular body whose internal surface is welded to an annulus of metallic leaf springs each connected to the outer end of a radially inwardly extending metallic spoke. The inner ends of the spokes are adjustably connected with a metallic sealing ring which is movable axially by a bellows into and from sealing engagement with a plate-like sealing member forming part of a plug-shaped or spherical valving element which is turnable or shiftable between open and closed positions. The bellows is caused to disengage the sealing ring from the sealing member prior to movement of the valving element to open or closed position and to engage the ring with the sealing member when the valving element assumes the open or closed position. That surface of the ring which is movable into sealing engagement with the sealing member has a channel which receives coolant by way of one or more ports in the sealing member and valving element. A stop is provided to limit the extent of movement of the ring in a direction away from the sealing member.

10 Claims, 1 Drawing Figure

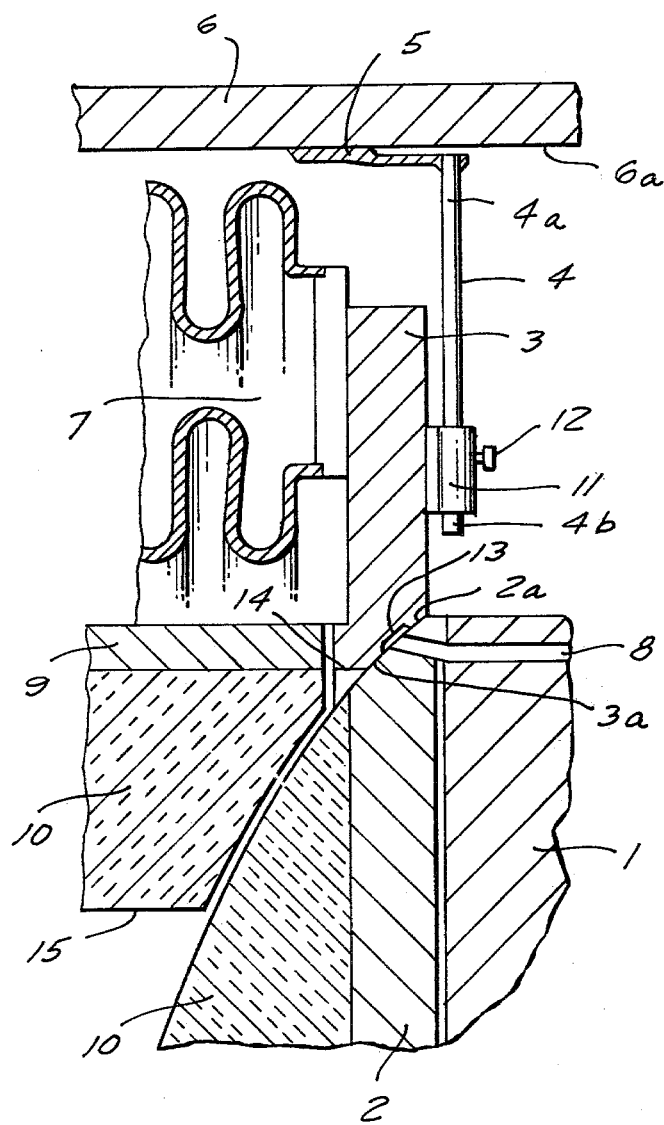

VALVE FOR CONTROLLING THE FLOW OF HOT FLUIDS

BACKGROUND OF THE INVENTION

The present invention relates to valves in general, especially to ball, plug or slide valves, and more particularly to improvements in valves which are intended to control the flow of hot and extremely hot fluids, e.g., in nuclear reactor plants and similar institutions. Still more particularly, the invention relates to improvements in annular sealing members (hereinafter called seats for short) which are used in such valves to sealingly engage the valving element at least while the latter assumes its closed position.

Valves which are used to control the flow of hot fluids are subjected to pronounced stresses, especially in the region where the valving element engages the seat. If the temperature of fluid and/or the surrounding atmosphere is in the range of several hundred °C. (e.g., between 500 and 600° C.), the valving element as well as the seat must be made of a metallic material. At such elevated temperatures, the valving element cannot be allowed to slide with respect to the seat because any sliding movement would result in substantial damage to or in immediate destruction of complementary sealing surfaces on the valving element and the seat. If the temperature exceeds a certain upper limit, the complementary surfaces are likely to become welded to each other.

It is already known to move the normally ring-shaped seat away from the valving element before the latter is caused to change its position by performing a turning, sliding and/or other movement. The seat is returned into sealing engagement with the valving element when the latter reaches and dwells in the newly selected position. Such measures are necessary in nuclear reactor plants and elsewhere when the temperature to which the seat and/or the valving element is exposed is sufficiently high to risk damage to or destruction of complementary sealing surfaces during movement of the valving element while the latter contacts the seat. The seat can be moved away from the valving element by resorting to hydraulical, pneumatic and/or mechanical moving means. In most instances, the seat is connected with a bellows whose interior can be filled with a pressurized fluid to urge the sealing surface of the seat against the sealing surface of the valving element. As a rule, the seat is moved axially in the interior of the valve body. It is also known to mount the seat on a ring-shaped piston which is installed in a cylindrical chamber adapted to recieve pressurized fluid from a source located externally of the valve body.

Additional problems arise when the valve is designed for use in regions where the temperature fluctuates within an extremely wide range, i.e., where the temperature is likely to rise to several hundred °C. or drop to a fraction of such value. Pronounced fluctuations of the temperature of the surrounding atmosphere are likely to result in radial shifting of the annular seat, i.e., a seat which is properly centered at a relatively low temperature is likely to be shifted radially in response to a pronounced rise in temperature, especially if the temperature is not uniform in the entire region around the seat. Radial or lateral shifting or tilting of the seat is likely to affect the sealing action when the seat is moved into engagement with the valving element. The likelihood of improper sealing action is further enhanced due to thermally induced deformation of the seat and/or due to unequal thermal stressing of such part. In many instances, minor or even minute movements of the seat from its optimum position and/or minor or minute distortion of the seat might result in pronounced leakage of contaminated fluid when the valve is used in a nuclear reactor plant. In other words, proper centering of the seat is of utmost importance, and such proper centering must be insured irrespective of the fact that the valve is likely to be used to regulate the flow of extremely hot fluids and/or that the temperature around the component parts of the valve is likely to fluctuate within an extremely wide range. The aforediscussed conventional means for moving the seat into and from sealing engagement with the valving element cannot insure proper centering of the seat under the just outlined circumstances. If the seat is mounted on an annular piston, the accuracy of centering depends to a large extent on the quality of bearings for the piston, on the extent of deformation of the valve body and/or on the wear upon the surfaces along which the piston slides while moving the seat to or from the valving element. The aforementioned tilting, thermally induced deformation or uneven stressing of the seat is likely to permit leakage of excessive quantities of fluid and/or direct contact between the metallic materials of the seat and valving element while the latter moves between open and closed positions.

The proposal to simply suspend the seat on a bellows also fails to eliminate the likelihood of improper centering of the seat because the bellows, too, is likely to undergo thermally induced deformation. Moreover, the pressure of fluid which is to cause the bellows to move the seat is likely to fluctuate and the weight of the bellow (and/or of the seat which is suspended thereon) is likely to affect the centering action. Therefore, the aforedescribed conventional valves cannot be used in nuclear reactor plants or for other applications where a satisfactory sealing action must be guaranteed at extremely high temperatures and/or under circumstances when the temperatures fluctuate within an extremely wide range.

OBJECTS AND SUMMARY OF THE INVENTION

An object of the invention is to provide a novel and improved valve which can function properly at normal temperatures, at elevated temperatures and also when the temperature fluctuates within an extremely wide range.

Another object of the invention is to provide a novel and improved mounting for the annular seat of a valve which can be used in nuclear reactor plants or other institutions where the temperature of fluid and/or the surrounding atmosphere can reach an extremely high value which is often in the range of several hundred °C.

A further object of the invention is to provide novel and improved means for securing the seat to the body of a valve for use at elevated temperatures, especially in nuclear reactor plants.

An additional object of the invention is to provide novel and improved means for accurately centering the annular seat of a valve which exhibits the aforediscussed features.

The invention is embodied in a valve, particularly for controlling the flow of hot fluids in nuclear reactor plants or the like. The valve comprises a valve body (e.g., a tubular body), a valving element (which may constitute a plug or sphere) installed in the valve body and movable between a plurality of positions including an open and a closed position, an annular sealing member or seat which is disposed in the interior of the valve body, a plurality of radially extending metallic supporting members (each supporting member may constitute a spoke the outer portion of which extends radially beyond the periphery of the sealing member), deformable metallic springs or other suitable yieldable metallic connectors which secure the outer portions of the supporting members to the valve body, and a bellows or other suitable means for moving the sealing member (preferably axially) into and from sealing engagement with the valving element. The valve preferably further comprises means for adjustably coupling the sealing member to the supporting members, e.g., in such a way that the sealing member can be adjusted radially in order to be properly centered with respect to the valving element.

The valving element has a surface which is sealingly engaged by a complementary surface of the sealing member when the latter is moved toward the valving element while the latter is idle, e.g., while the valving element assumes the open or closed position. At least one of these surfaces can be formed with one or more coolant-circulating channels and the other surface is then provided with ports which admit fresh coolant to and/or evacuate spent coolant from the channel or channels.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic fragmentary sectional view of a ball valve which embodies the invention, the sealing member being shown in engagement with the valving element.

DESCRIPTION OF THE PREFERRED EMBODIMENTS

The drawing shows a portion of a tubular valve body or housing 6 having a cylindrical internal surface 6a. The body 6 confines a spherical valving element 1 which has a plate-like sealing member 2 provided with a convexly curved annular peripheral surface 2a. The surface 2a is complementary to a concavely curved annular internal surface 3a forming part of an annular sealing member or seat 3 which is installed and adjustable in the body 6 in accordance with the present invention. The parts 1, 2 and 3 consist of a temperature-resistant metallic material. The means for mounting the seat 3 in the valve body 6 comprises a plurality of metallic supporting members 4 (only one shown) which extend radially of the seat 3 and are preferably equally spaced from each other, as considered in the circumferential direction of the number 3. The outer portions 4a of the supporting members 4 (each of which resembles or constitutes an elongated rod or spoke) are welded to the free end portions of deformable metallic connectors 5 each of which is welded to the internal surface 6a of the valve body 6. The connectors 5 may constitute metallic leaf springs. In order to allow for adjustments of the seat 3 in the radial direction of the body 6, the valve preferably further comprises means for adjustably coupling the seat 3 to the inner portions 4b of the supporting members 4. Such coupling means may include sleeves 11 which are turnably mounted on the seat 3 and can be releasably affixed to the respective supporting members 4 by screws or analogous fasteners 12.

The means for moving the seat 3 axially in the valve body 6 comprises a metallic bellows 7 connectable to an external source of pressurized fluid to thereby increase its length and to urge the surface 3a against the complementary surface 2a. The bellows 7 contracts when the pressure in its interior drops whereby the seat 3 is moved axially in a direction to the left, as viewed in the drawing, until it comes into abutment with and is arrested by a cylindrical stop 9. Axial movability of the seat 3 is insured due to the provision of metallic connectors 5 which are elastically deformable or consist of a ductile material that is merely deformable but need not exhibit pronounced elastomeric properties. When the seat 3 abuts against the stop 9, the valving element 1 is moved (e.g., turned or shifted) to a different position, either to permit the flow of fluid through the valve, to prevent the flow of fluid, or to change the rate of fluid flow in the body 6.

The surface 3a of the seat 3 has at least one circumferential channel or groove 13 which surrounds the opening 14 in the seat 3 and communicates with ports 8 provided in the valving element 1 and its sealing member 2 when the seat 3 assumes the illustrated position. The port of ports 8 serve for admission of fresh coolant and/or for evacuation of spent coolant from the channel 13. It is clear that the channel 13 can be provided in the surface 2a and that such channel can receive coolant by way of one or more ports in the seat 3. As a rule, the seat 3 will be held in the illustrated position; it is normally moved away from the sealing member 2 only when the valving element 1 is about to be moved to a different position.

The reference characters 10 denote layers of heat-insulating material which coat the inner side of the stop 9 and the exposed surface of the sealing member 2 to prevent direct contact between hot fluid and such parts.

Once the seat 3 is properly centered in the body 6, its radial position can remain unchanged. The coupling means 11, 12 allow for centering of the seat 3 in order to compensate for possible machining tolerances.

The valving element 1 is turnable between open and closed positions about an axis which is normal to the axis of the seat 3 and is located in the plane of the drawing. The other (righthand) side of the valving element 1 carries a second sealing member corresponding to the member 2 and cooperating with a second seat in the same way as described for the seat 3. Reference may be had to our commonly owned copending application Ser. No. 819295 filed July 27, 1977. The reference character 15 denotes the passage wherein the liquid flows through the valve when the valving element 1 is turned through 90 degrees to assume its open position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In a valve, particularly for controlling the flow of hot fluids in nuclear reactor plants or the like, the combination of a valve, body; a valving element installed in said body and movable between a plurality of positions including an open and a closed position; an annular sealing member; means for mounting said sealing member in the interior of said body for movement in a predetermined path into and out of a predetermined position in which said sealing member is centered relative to said valving element and sealingly engages the same, including a plurality of metallic supporting members extending substantially radially outwardly of said sealing member and secured to and movable with said sealing member, and deformable metallic connectors and means securing said connectors to said body and to said supporting member; and means for moving said sealing member in said path into and from said predetermined position with attendant deformation of said connectors as a result of movement of said supporting members with said sealing member.

2. The combination of claim 1, said mounting means comprising means for adjustably coupling said sealing member to said supporting members.

3. The combination of claim 2, wherein said supporting members are rods and said coupling means are shiftable axially of said rods.

4. The combination of claim 1, wherein said connectors are leaf springs.

5. The combination of claim 1, wherein said sealing member is movable axially in said body and said moving means comprises a bellows.

6. The combination of claim 1, wherein said supporting members have portions extending radially outwardly beyond said sealing member and said connectors securing means secure said portions of said supporting members to said body.

7. The combination of claim 6, wherein said supporting members are equally spaced from each other, as considered in the circumferential direction of said sealing member.

8. In a valve, particularly for controlling the flow of hot fluids in nuclear reactor plants or the like, the combination of a valve body; a valving element installed in said body and turnable between a plurality of positions including an open and a closed position; an annular first sealing member accommodated in said housing; a second sealing member on said valving element; means for mounting said first sealing member in the interior of said body for movement in a predetermined path into and out of a predetermined position in which said first sealing member is centered relative to said valving element, and to said second sealing member in one of said positions of said valving element, including a plurality of substantially radially outwardly extending metallic supporting members secured to said sealing member, and deformable metallic connectors and means securing said connectors to said body and to said supporting members; and means for moving said first sealing member with respect to said valve body into and from said predetermined position in which said second sealing member is in sealing engagement with said first sealing member.

9. The combination of claim 8, wherein said annular first sealing member has a first surface bounding at least a portion of a central opening, said second sealing member having a second surface which is engaged by said first surface in said predetermined position of said first sealing member.

10. The combination of claim 9, wherein at least one of said surfaces has a coolant-circulating channel and the other of said surfaces has port means for supplying coolant to said channel.

* * * * *